United States Patent

Phan et al.

[11] Patent Number: 5,469,881
[45] Date of Patent: Nov. 28, 1995

[54] VALVE ASSEMBLIES

[75] Inventors: Chan B. Phan, Irvine, Calif.; Michael Walsh, Cypress, Tex.

[73] Assignee: Control Components Inc., Rancho Santa Margarita, Calif.

[21] Appl. No.: 253,700

[22] Filed: Jun. 3, 1994

[30] Foreign Application Priority Data

Jun. 4, 1993 [GB] United Kingdom ............. 9311629

[51] Int. Cl.⁶ .................................. B65D 45/10
[52] U.S. Cl. ................. 137/315; 138/89; 220/256; 220/327
[58] Field of Search ................... 137/312, 315, 137/625.33, 625.34, 625.35, 625.36, 454.6; 138/89; 220/256, 288, 327, 378, 465, 601

[56] References Cited

U.S. PATENT DOCUMENTS

| 1,268,597 | 6/1918 | Montreuil | 137/625.34 |
|---|---|---|---|
| 1,922,954 | 8/1933 | Hughes | 137/625.34 |
| 2,098,014 | 11/1937 | Polston | 137/625.34 |
| 2,106,300 | 1/1938 | Harrison | 137/625.34 |
| 2,203,364 | 6/1940 | Rathbun | 220/327 |
| 2,519,572 | 8/1950 | Hill | 220/256 |
| 2,919,048 | 12/1959 | Harvey | 220/256 |
| 3,156,375 | 11/1964 | Long | 220/327 |
| 3,528,448 | 9/1970 | Urban | 137/315 |
| 3,884,268 | 5/1975 | Wagner et al. | 137/625.36 |
| 4,384,655 | 5/1983 | Kendall | 220/256 |
| 4,512,496 | 4/1985 | Tsou | 220/327 |
| 4,589,564 | 5/1986 | Olster et al. | 220/3 |
| 4,736,766 | 4/1988 | Bathrick et al. | 137/315 |
| 4,968,002 | 11/1990 | Gibson et al. | 251/266 |
| 5,261,453 | 11/1993 | Hekkert et al. | 137/625.34 |

FOREIGN PATENT DOCUMENTS

| 743881 | 1/1956 | United Kingdom . |
|---|---|---|
| 1271447 | 4/1972 | United Kingdom . |

Primary Examiner—George L. Walton
Attorney, Agent, or Firm—Cushman Darby & Cushman

[57] ABSTRACT

A high pressure stop kit for a valve assembly such that an inspection port can be sealed. The kit includes a plug to be screwed into the port and an over-plate secured to that plug. The interface between the plate, plug and port secured to that plug. The interface between the plate, plug and port wall being sealed by a gasket 'O' ring or other appropriate sealing means held in necessed sections.

7 Claims, 3 Drawing Sheets

VALVE ASSEMBLIES

The present invention relates to valve assemblies and more particularly, but not exclusively to high pressure breech valve assemblies.

A typical breech or Bailey valve assembly is illustrated in FIG. 1. A valve body 1 has an inlet 3a and an outlet 3b through which the regulated fluid flows. The inlet 3a and the outlet 3b respectively have flanges or weld ends to enable pipe work or similar to be attached to the valve body.

Regulation of fluid flow is conducted by a valve cage 5 and valve shuttle 7. Fluid passes through an aperture in the cage 5 and the shuttle 7 is displaceable axially as shown by the arrowheads. Thus, when the shuttle 7 is displaced, fluid, such as super heated steam, can pass through the cage 5 and around the shuttle 7. This fluid is then exhausted through the outlet 3b.

The shuttle 7 is actuated by either a manual or automatic actuator (not shown) through a stem 9. The stem 9 is surrounded by packing 11 to provide a seal.

The cage 5 is sealed by gaskets 15, 17 and locked in place by a nut 19.

It will be appreciated in order to maintain and renewal the valve shuttle 7 and cage 5 access is necessary. This access is provided through a breech 2. Of course, it is necessary to seal this breech 2 when the valve is in use. This seal is provided by a breech screw 4, breech packing 6, a packing follower 8 and packing holder 10. Furthermore, a drain plug 12 is provided to enable removal of small amounts of liquid that have leaked past the packing 6. The drain plug 12 also acts to secure the packing 6 by screwing into the holder 10 to clamp the assembly together. The breech screw 4 is welded to the holder 10. This weld ensures there is a seal to prevent leakage.

When the valve is operating, a hydro force is applied on the large surface of the breech assembly. The breech packings 6 are compressed much more than using the plug 12. After the high pressure is withdrawn the breech packings 6 are relaxed; this cycle of the valve on and off creates a leak path between the breech packings 6 and valve body 1 wall. Thus, the seal created by welding the breech screw 4 to the holder 10 is broken.

As the fluid passing through the breech valve may be super-heated steam under high pressure such leakages can be dangerous and potentially lethal.

It is an objective of the present invention to provide a valve assembly that substantially relieves the above mentioned problems.

In accordance with the present invention there is provided a valve assembly including a breech suitable for inspection of the valve assembly, the breech sealed in use by a breech block and flange assembly, the breech block being secured in the breech and the flange being secured to the breech block to ensure gasket means between the breech block and the flange seal the junction between the breech block and the breech of the valve assembly.

Preferably, the breech block is secured in the breech with a screw thread.

Preferably, the gasket means comprises two gaskets arranged concentrically on either side of the junction or interface between the breech block and the breech surface of the valve assembly.

Preferably, the flange includes a central inspection hole positioned to allow determination whether the inner gasket of the gasket means has failed by leaking.

Preferably, the flange is secured to the breech screw by a plurality of bolts secured in bolt holes in the screw breech.

In accordance with a further aspect of the present invention there is provided a breech block/flange assembly for blocking a breech in a valve assembly, the assembly comprising a block to be secured in the breech and the flange being secured to the block with gasket means between to seal the interface between the block and the breech.

An embodiment of the present invention will be described by way of example only with reference to:

FIG. 2 in which a valve assembly is shown in schematic cross-section;

FIG. 3 in which a breech screw and flange are shown in schematic cross-section;

Figure 1:
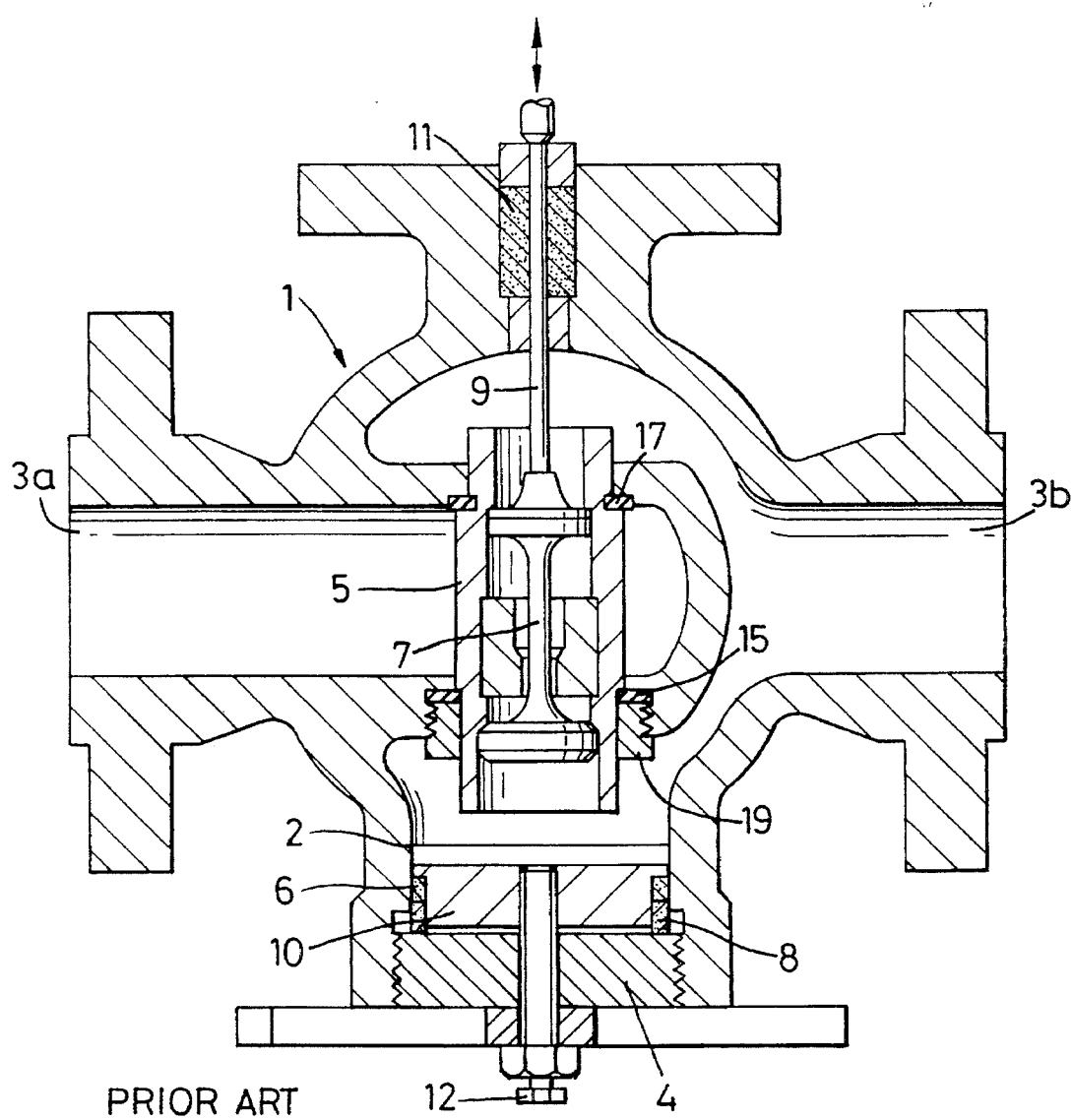
Figure 2:
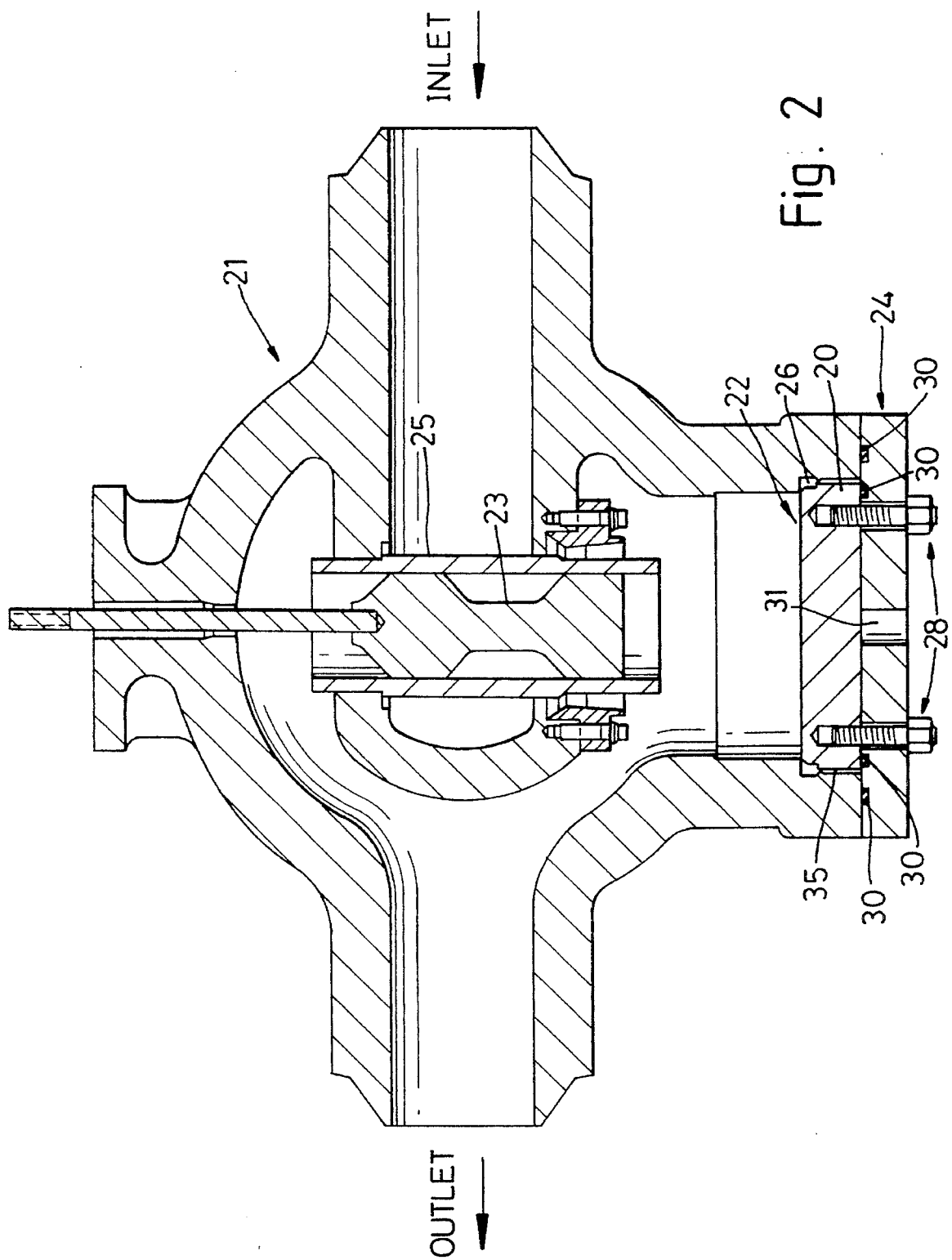

Consider FIG. 2. A valve assembly 21 similar to that illustrated in FIG. 1 is shown. However, the view is from a reverse angle and the inventive breech configuration is present in FIG. 2.

The valve assembly 21 operates in a similar fashion to that described with regard to assembly 1. A valve shuttle 23 moves axially in a valve cradle 25 in order to allow fluid to pass through the valve 21.

The valve assembly 21 has a breech 20 for maintenance and inspection of the valve mechanism. The breech 20 is sealed by a breech screw 22 and flange 24 assembly. The breech screw 22 is screwed into the breech 20 through a screw thread. There may be a recess to accommodate packing or a sealing ring at the top of the screw thread.

The flange 24 is secured to the breech screw 22 through bolts 28 which tighten into threaded recesses in the screw 22.

At the core of the present invention is the provision of a gasket assembly about the bottom of the breech screw 22 and assembly 21 screw thread interface. Typically, a gasket 30 is located in recesses on either side of the interface. However, it is possible for low pressure valve assembly to have a single outer gasket. In such low pressure systems it is not necessary to have a central inspection port 31 that enable a determination of whether the inner gasket has failed.

The bolts 28 tighten the flange 24 to the breech screw 22 and assembly 21. Thus, the gaskets 30 are compressed and provide a seal.

Figure 3:
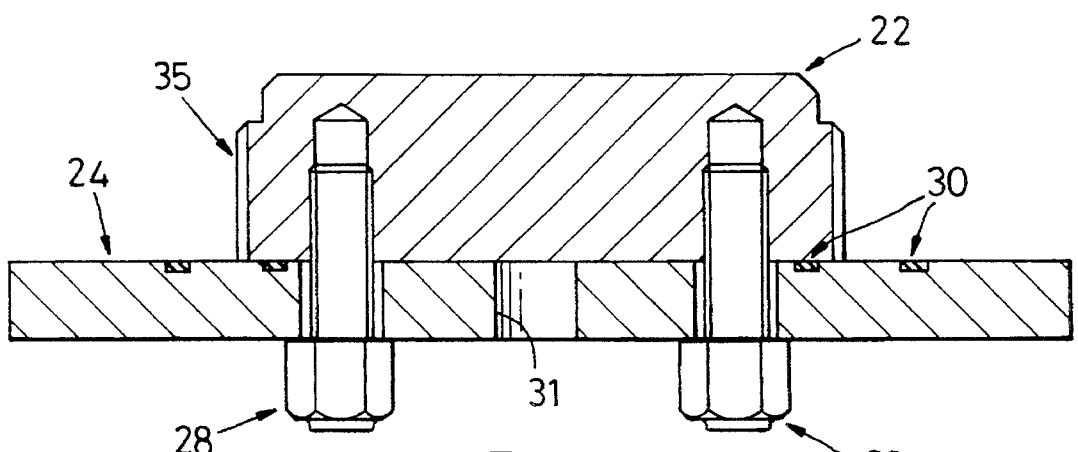

FIG. 3 illustrates the breech screw 22 and flange 24 assembly in cross-section. The bolts 28 enter the screw 22 in order to tighten the flange 24 bearing the gaskets 30 to the screw 22.

It will be appreciated that an influential factor in determining how tight the flange 24 and screw 22 can be brought together is the bolt 28 penetration into the screw 22. However, this penetration is limited by screw thickness and regulatory guidelines as to bolt cross-section to valve pressure performance. Typically, the bolt penetrates one and a half times its diameter into the breech screw 22. The screw 22 itself has a screw thread 35 to secure it in the valve housing 21. Thus, the flange 24 is also tightened to the housing 21 using the bolts 28. However, if practical, further bolts or alternate bolts to bolts 28 could be arranged to screw into the housing 21 directly through the flange 24.

Gaskets 30 provide respective seals on either side of the screw thread interface 26. However, it is possible to place a further seal directly below the screw thread 35 that could supplement or replace either or both gaskets 30. If the central inspection hole 31 is removed it is possible to merely have a single outer gasket beyond the screw thread 35 provided bolts 28 can accommodate surge pressures that may build up in the area between the screw 22 and flange 24.

Figure 4:
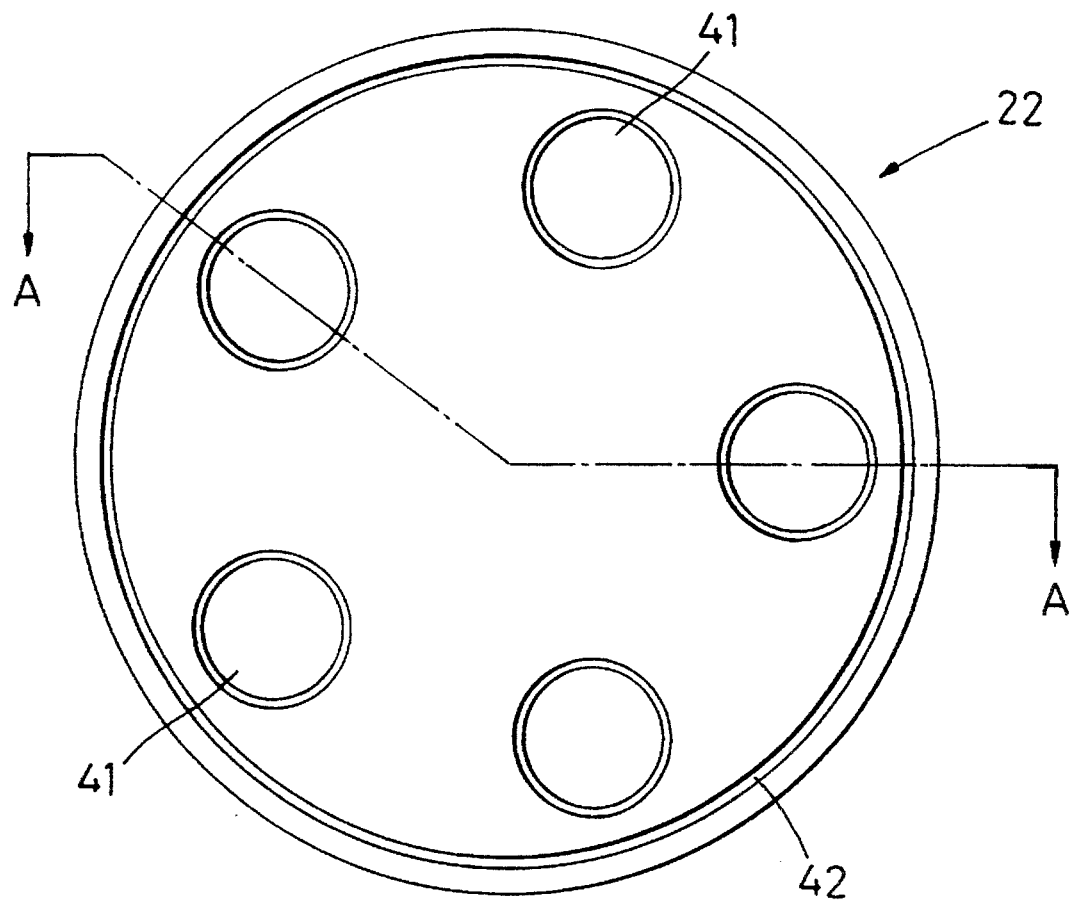
FIG. 4 is a schematic plan view of the breech screw shown in FIG. 3.
Figure 5:
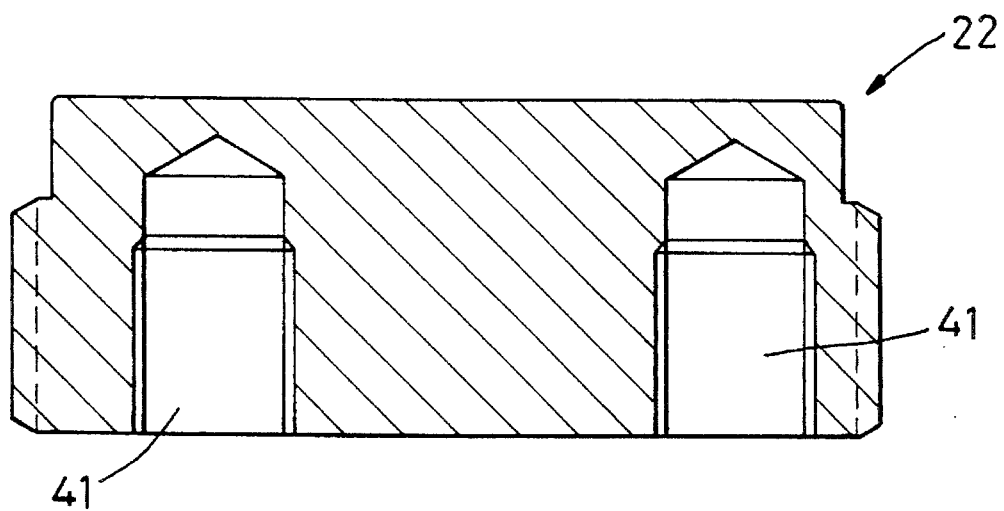
FIG. 5 is a schematic cross-section along the line A—A depicted in FIG. 4.

FIGS. 4 and 5 snow the breech screw 22 in greater detail. The screw 22 has bolt holes 41 arranged to receive the bolts 28 in order to secure the flange 24. These holes 41 extend across the major part of the screw 22 thickness. Thus, the bolt 28 penetration can be maximized to ensure a good seal by gaskets 30. Furthermore, the screw 22 has a channel 42 arranged to accommodate the inner gasket 30 for location purposes. Alternatively, a similar channel can be provided in the flange 24 and housing 21 for the outer gasket. However, in order to ensure a good seal the non-channeled, mating surface, is roughened.

Although five bolt holes 41 are illustrated in FIG. 4 it will be appreciated that the numbers of bolt holes 41 is dependent upon the degree of bolting necessary to achieve performance. However, it will also be understood that there may be limitations upon the amount or availability of bolting area.

The flange 24 and breech screw 22 may be made of pressure vessel steel. The gaskets may be made of spiral wound carbon filled material or, with a low pressure/temperature assembly, may be a simple rubber 'O' ring seal.

We claim:

1. A breech block flange assembly for blocking a breech opening in a valve assembly, the assembly breech block flange comprising:

a block to be secured in the breech opening to effectively close the breech opening, a flange extending along a surface of said block and a surface of said valve assembly adjacent said opening and being secured to the block through fastening means, and gasket structure disposed between the block and the flange constructed and arranged to seal the junction between the block and the breech opening to prevent the escape of fluid therethrough, the fastening means securing only the flange to the block such that walls of the valve assembly about the breech opening are free of any fasteners.

2. A valve assembly comprising:

a valve body having a breech opening for inspection of the valve assembly, said breech opening being closed by an assembly comprising:

a breech block coupled to the valve body so as to close said breech opening, a flange extending along a surface of said block and a surface of said valve body adjacent said opening and being coupled to said breech block by fasteners, and gasket structure disposed between the breech block and flange to seal a junction between the breech block and the breech opening to prevent escape of fluid therethrough, said fasteners securing only the flange to the breech block such that walls of said valve body about the breech opening are free of any fasteners.

3. A valve assembly as claimed in claim 2 wherein the breech block is secured in the breech opening of the valve body with a screw thread.

4. A valve assembly as claimed in claim 2 wherein the gasket structure comprises two gaskets arranged concentrically, on either side of the junction between the breech block and the breech opening.

5. A valve assembly as claimed in claim 2 wherein the flange includes a central inspection hole positioned to allow determination of whether an inner gasket of the gasket structure has failed by leaking.

6. A valve assembly as claimed in claim 2 wherein the flange is secured to the breech block by a plurality of bolts.

7. A valve assembly comprising:

a valve body having a breech opening for inspection of the valve assembly, said breech opening being closed by a weldless assembly comprising:

a breech block coupled to the valve body so as to close said breech opening, a flange extending along a surface of said block and a surface of said valve body adjacent said opening and being coupled to said breech block by fasteners, and gasket structure disposed between the breech block and flange to seal a junction between the breech block and the breech opening to prevent escape of fluid therethrough, said fasteners securing only the flange to the breech block such that walls of said valve body about the breech opening are free of any fasteners.

* * * * *